(12) United States Patent
Trembley

(10) Patent No.: US 7,117,283 B2
(45) Date of Patent: Oct. 3, 2006

(54) MULTI-MASTER EXTENDED I2C PROTOCOL

(75) Inventor: Matthew Trembley, Grayson, GA (US)

(73) Assignee: LSI Logic Corporation, Milpitas, CA (US)

( * ) Notice: Subject to any disclaimer, the term of this patent is extended or adjusted under 35 U.S.C. 154(b) by 369 days.

(21) Appl. No.: 10/202,521

(22) Filed: Jul. 24, 2002

(65) Prior Publication Data
US 2004/0019720 A1 Jan. 29, 2004

(51) Int. Cl.
*G06F 13/00* (2006.01)
(52) U.S. Cl. ........................................ 710/110; 710/105
(58) Field of Classification Search .............. 710/8–10, 710/104–107, 110; 370/438
See application file for complete search history.

(56) References Cited

U.S. PATENT DOCUMENTS

| | | | |
|---|---|---|---|
| 5,444,847 A * | 8/1995 | Iitsuka | 710/107 |
| 5,758,098 A * | 5/1998 | Townsley et al. | 710/301 |
| 6,049,893 A * | 4/2000 | Liddell et al. | 714/23 |
| 6,457,078 B1 * | 9/2002 | Magro et al. | 710/105 |
| 6,745,270 B1 * | 6/2004 | Barenys et al. | 710/104 |

OTHER PUBLICATIONS

I2C Bus Specification, Ver. 2.1, Jan. 2000.*

* cited by examiner

*Primary Examiner*—Khanh Dang
(74) *Attorney, Agent, or Firm*—Suiter West Swantz PC LLO

(57) ABSTRACT

An extended protocol provides a serial bus with the capability of effective communications for a multimaster bus. A bus device may enter a master mode and transmit information identifying a designated recipient device on the bus. Either the master mode device or the designated recipient device may send information that identifies the master mode bus device. The master mode device may read from the designated recipient device or may write to the designated recipient device. The designated recipient device may provide an acknowledgement, data, a command, or status information may be sent back. The status information may include version information regarding the hardware, software, and/or firmware of the designated recipient device.

21 Claims, 4 Drawing Sheets

MULTI-MASTER EXTENDED I2C PROTOCOL

FIELD OF THE INVENTION

The present invention generally relates to the field of data buses, and particularly to an extended protocol for a serial bus.

BACKGROUND OF THE INVENTION

Certain serial data bus protocols do not allow for more than one master device on the bus. In particular, the Inter Integrated Circuit bus offers multimaster capability and an arbitration procedure to help ensure that that only one master device controls the bus in the event two or more master devices seek to control the bus simultaneously. However, there are deficiencies in the current protocol to adequately handle communications with more than one master device. When a master mode device tries to communicate with a slave mode device, the slave mode device is not provided with information that identifies the master mode device. The lack of identification presents a problem because the slave mode device is unable to present data or commands to the master mode device in a format specific to the master mode device. Further, the various devices are constantly subjected to updates to remove bugs and otherwise improve performance. Currently, there is no means for the devices in slave mode to make other devices in master mode in communication aware of their version. Overall system efficiency is accordingly reduced.

Therefore, it would be desirable to provide a multimaster protocol for a serial data bus, especially an Inter Integrated Circuit bus.

SUMMARY OF THE INVENTION

Accordingly, the present invention is directed to an extended protocol for a serial data bus, especially, an Inter Integrated Circuit (I2C) or System Management (SM) bus.

The present invention offers more reliable communications on a serial data bus having multiple master mode devices by overcoming the prior art disadvantage that the slave mode devices were not provided with identification information from the master mode device and were not provided with the capability to identify the version of the device.

In the present invention, a method and system for communicating across an Inter Integrated Circuit bus through which two or more master mode devices are connected is disclosed, comprising the step of sending identification information for a master mode device. Alternatively, or in addition, there is a step in which the designated recipient device provides information, including version information, upon request.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to protocol or a protocol extension for a serial bus having multiple devices. The serial bus may be a bus having two dedicated signal lines, such as the Inter Integrated Circuit (I2C) or System Management (SM) bus. The serial data bus may be a one-wire, two-wire, three-wire, or other multi-wire bus. All devices on the bus may have a slave mode that serves as a default mode. At least two of the devices may have a master mode.

Figure 1:
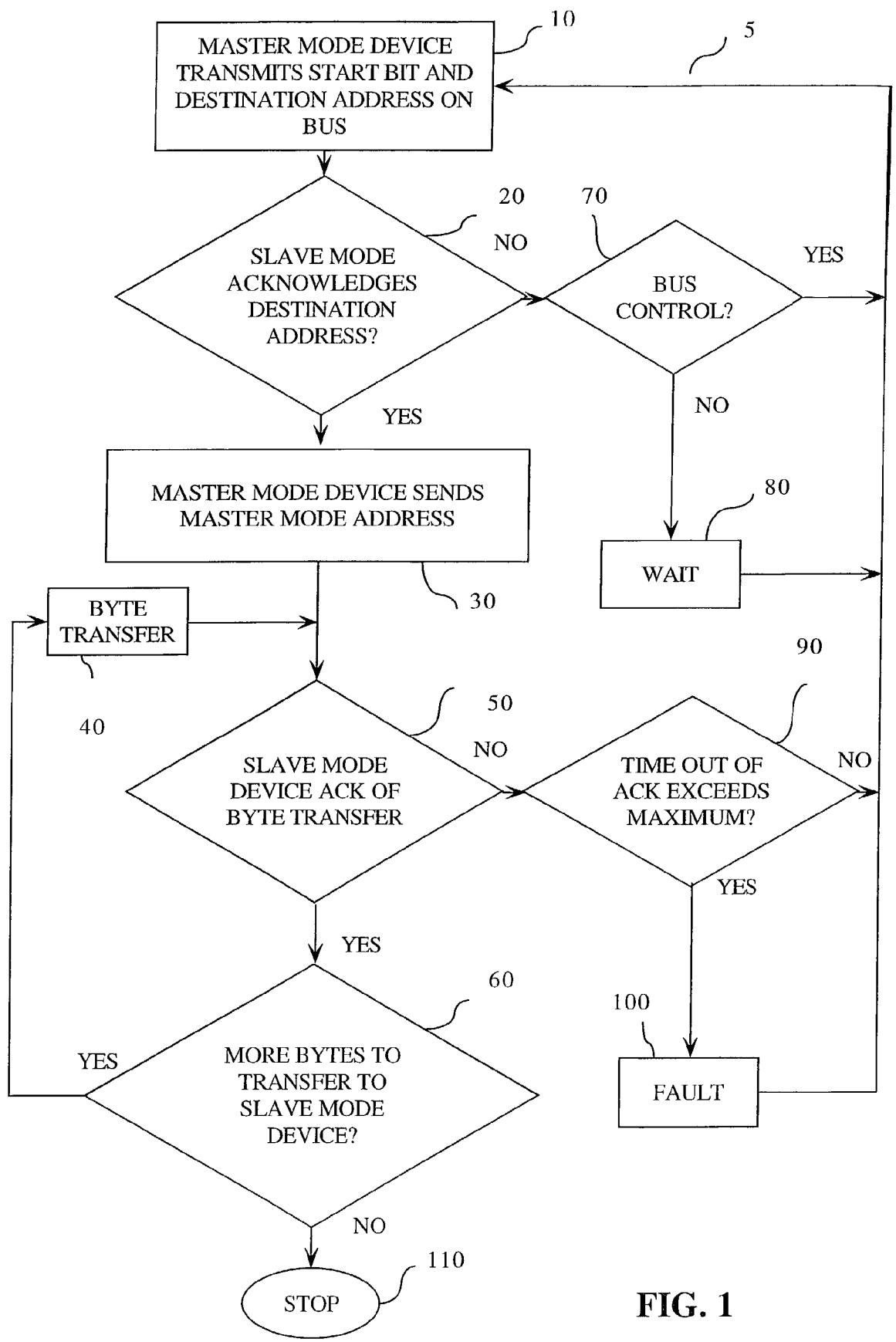
FIG. 1 illustrates a flow chart of the processing steps of an exemplary embodiment of the method of the present invention for a write operation.

FIG. 1 illustrates a method 5 for establishing communications between two devices connected to a serial bus for a write operation, according to the present invention. A device on the bus, because a condition has been met, makes a determination to communicate with another device on the bus. The condition may be the receipt of data, a fault condition, a timing condition, and the like. The device that initiates and controls the communications with another bus-linked device enters a master mode. The master mode device sends a start bit(s) and an address identifying a designated recipient device on the bus, per step 10. The bus may or may not be provided with arbitration, i.e., a process to ensure that, if two or more master mode devices simultaneously attempt to control the bus, only one is permitted to do so and no data corruption occurs. If the designated recipient device does not acknowledge the master mode device's transmission of the designated recipient device's address, per step 20, a determination may be made as to whether bus control is available, per step 70. If bus control is not available, the master mode device may wait, as per step 80. The wait step may be accomplished by a timer resident within the master mode device. After the wait cycle is over, processing proceeds to step 10. If bus control is available, at step 70, the master mode device may resend the address identifying a designated recipient device, as per step 10. After the slave mode device acknowledges the address identifying a designated recipient device of the master mode device, as per step 20, the master mode device sends the master mode device address as a byte, as per step 30. If it is determined that the slave device is not acknowledging the transfer of a byte, as per step 50, a determination is made as to whether the master mode device has exceeded a time out condition for sending a byte to the slave mode device, as per step 90. If it has, a fault condition is set, as per step 100. Otherwise, if the slave mode device is not acknowledging the transfer of a byte, the processing returns to step 10. If the slave mode device acknowledges the transfer of the byte, as per step 50, a determination is made as to whether there is data to transfer, per step 60. Otherwise, data transfer stops, per step 110. If there is data to transfer, processing proceeds to step 40 in which the master mode device sends a byte from the payload. A scheme requiring an acknowledge for each byte received may be used. Although the term byte generally refers to a unit of 8 or 9 bits, other sizes of bit blocks or units may be used with the present invention. In the write operation, the data flow (or protocol) must contain information that identifies the master mode device as well as the designated recipient device.

Figure 2:
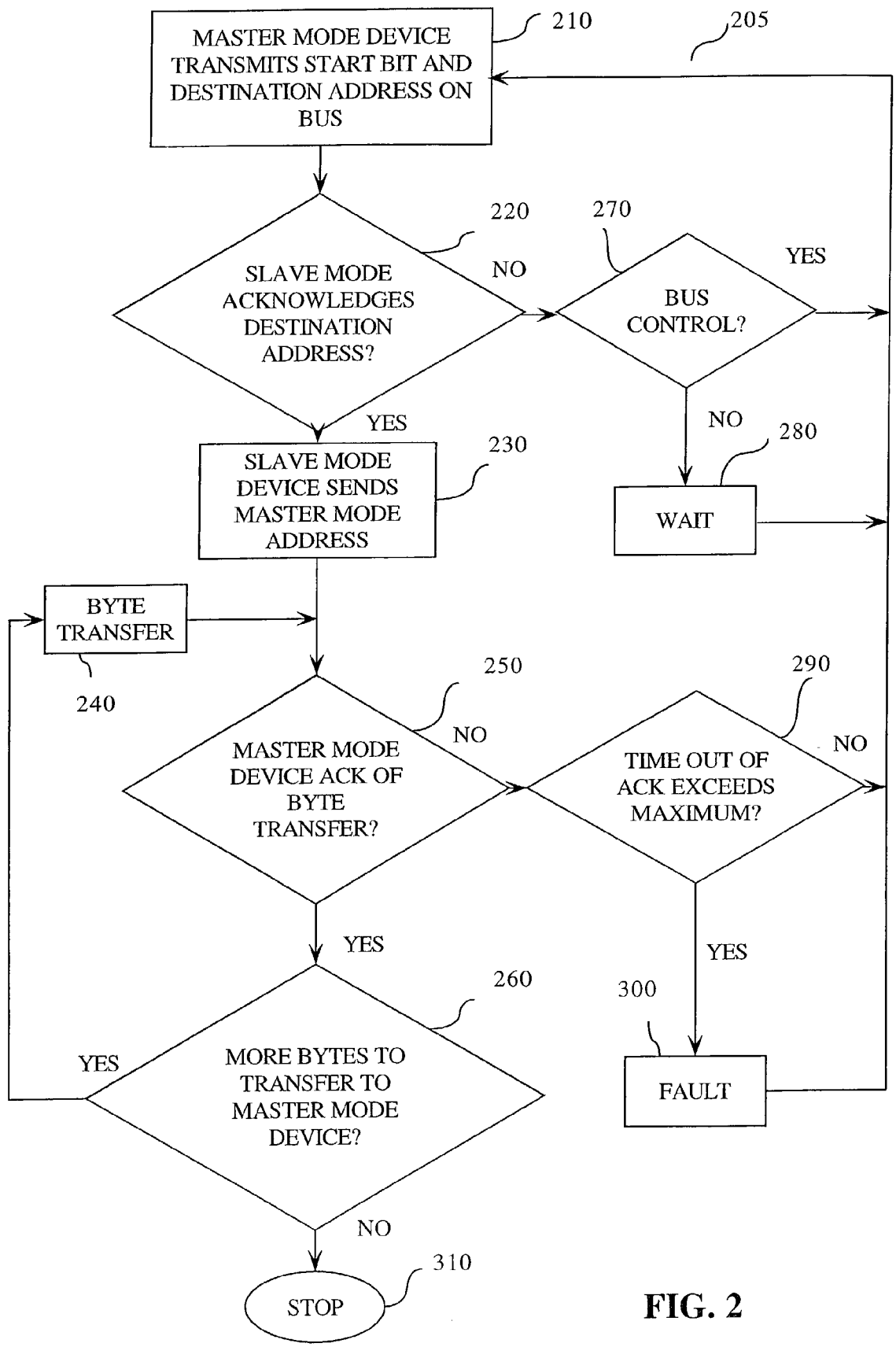
FIG. 2 illustrates a flow chart of the processing steps of an exemplary embodiment of the method of the present invention for a read operation.

FIG. 2 illustrates a method 205 for establishing communications between two devices connected to a serial bus for a read operation, according to the present invention. The master mode device puts a start bit(s) and a designated recipient (slave mode) device address on the bus for the other device, per step 210. If the designated recipient device does not acknowledge the master mode device's request, per step 220, a determination may be made as to whether bus control is available, per step 270. If bus control is not available, the master mode device may wait, as per step 280. The wait step may be accomplished by a timer resident within the master mode device. After the wait cycle is over, processing proceeds to step 210. If bus control is available, at step 270, the master mode device may resend the start bit(s) and a designated recipient (slave mode) device address, as per step 210. After the slave mode device acknowledges the designated recipient device address sent by the master mode device, as per step 220, the slave mode device sends the master mode device address onto the bus, as per step 230. A determination is made as to whether the master mode device has acknowledged the transfer of the byte, as per step 250. If there is no acknowledgment by the master mode device, processing proceeds to step 290. If the time out condition has been met, the processing enters a fault mode, per step 300, which may or may not terminate further processing and which may include notification through indicator lights, an audible alarm, or a message on a display screen. If there is an acknowledgment by the master mode device, per step 250, a determination is made as to whether there is still data to transfer to the master mode device, per step 260. If there is, the next data byte is transferred, per step 240, and thereafter, the processing proceeds to step 250. Otherwise, processing stops, per step 300. Step 260 is an optional step for determining by an algorithm or circuit that there is more data to transfer. In an alternate embodiment, if it is determined in step 250 that is there is an acknowledgement by the master mode device, the next processing step is step 240. That is, in the alternate embodiment, if a master mode device receives data, the master mode device must signal the end of data to the slave mode device that is transmitting by not generating an acknowledge. In the read operation, the data flow (protocol) must contain information that identifies the master mode device as well as the designated recipient device.

Variations of these methods may be employed. For instance, the back and forth dialog between the master mode and slave mode devices may be extensive and may involve the mutual acknowledgment between the master mode and slave mode devices that communications are to be terminated. Also, processing may simply entail a determination that the designated recipient device acknowledges the master mode device's frame in which the slave mode device performs an indicated function.

Figure 3:
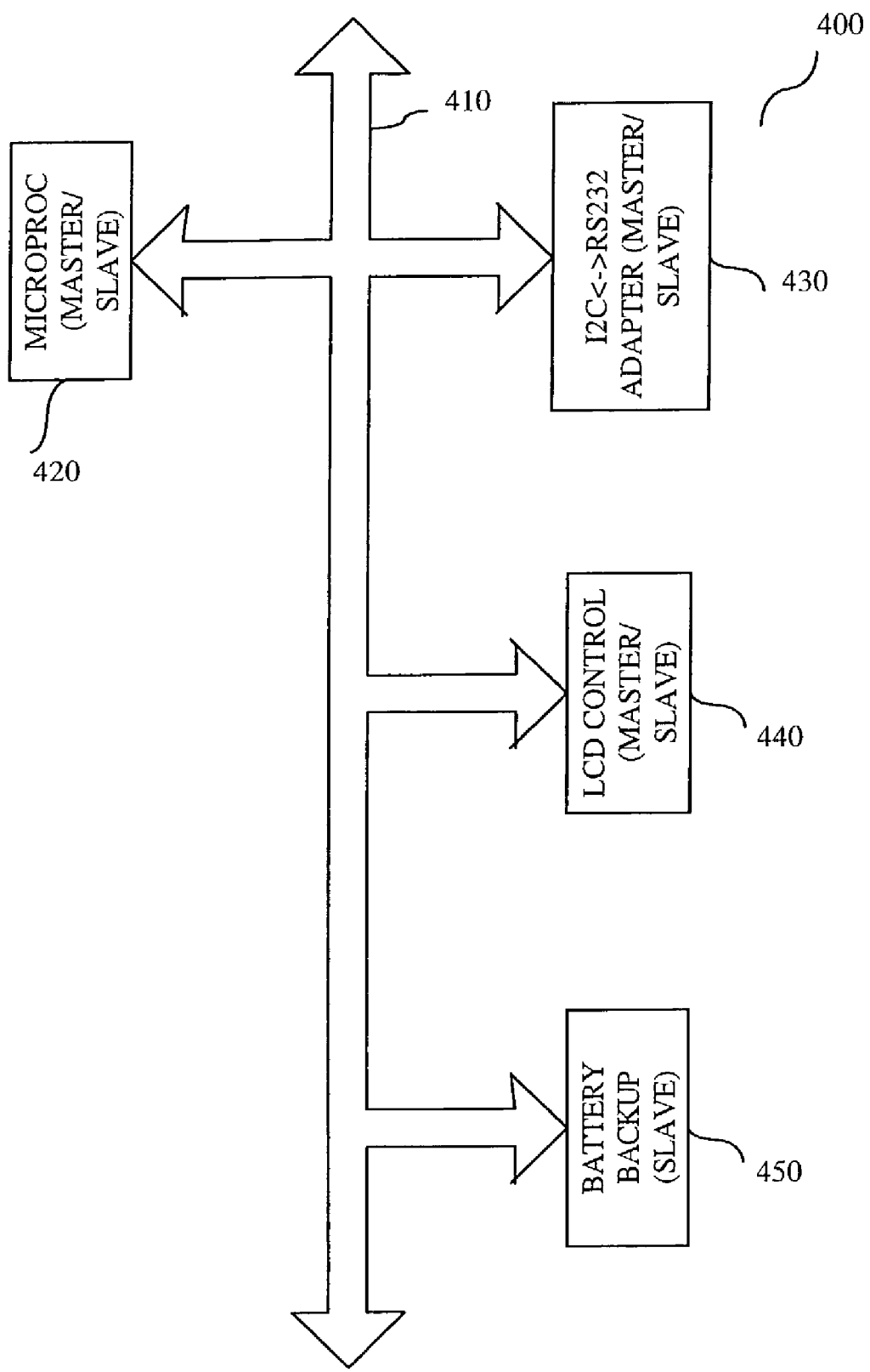
FIG. 3 illustrates an exemplary bus of the present invention.

FIG. 3 illustrates an exemplary embodiment 400 of the serial bus 410 of the present invention. A microprocessor or other processor 420 may be used to provide many operational functions for the system. A bus-to-bus adapter 430 may be used to communicate with various devices on a linked bus. These devices may be legacy devices that are connected to an existing bus or may be a local area network. A display device 440 may have an operator control interface, such as a graphical user interface, for communicating with the system. A back up power source 450, such as a battery backup, may be employed. Alternatively, the primary power source may be battery operated. This arrangement allows for portable devices that use the serial bus. Interface devices may be provided that are connected to the bus which wirelessly communicate with another device, such as a portable, hand held device.

Figure 4:
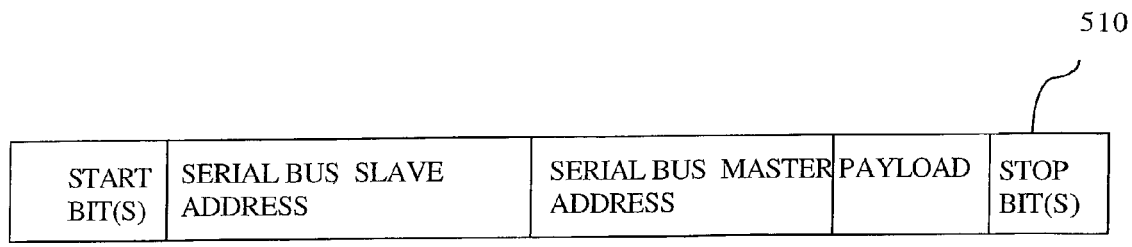
FIG. 4 illustrates an exemplary data flow (or protocol) for a transaction of the present invention.
Figure 5:
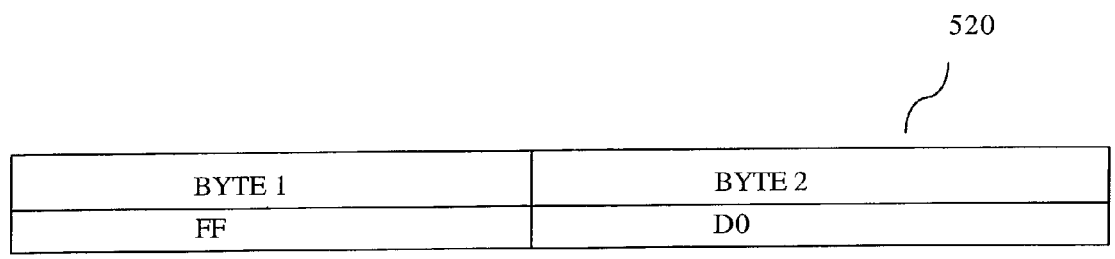
FIG. 5 illustrates an exemplary command issued by the master mode device in the present invention.
Figure 6:
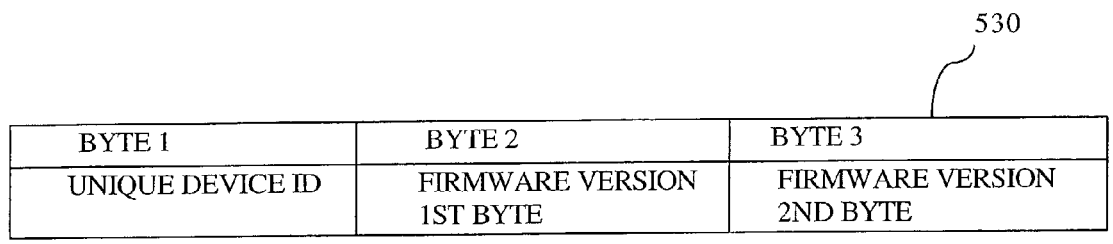
FIG. 6 illustrates an exemplary response payload by the slave mode device in the present invention.

Certain protocols may be used in establishing communication and exchanging data and commands over the bus. For example, FIGS. 4–6 illustrate an exemplary protocol. Any device on the bus that has a master mode may commence communications with the desired recipient device by transmitting an initial start bit(s) and a designated recipient (slave mode) device address, as shown in FIG. 4. Each device on the bus may be required to support arbitration. The information received by the recipient device may be formatted in accordance with the recipient device's communication specifications. After a start bit(s) and a designated recipient (slave mode) device address is sent by the master mode device and acknowledged by the slave mode device 520, a command may be transmitted from the master mode device to the designated recipient (slave mode) device, as shown in FIG. 5. Alternatively, the slave mode device may acknowledge receipt of the start bit(s) and a designated recipient (slave mode) device address and may indicate availability. A bi-directional exchange may be initiated according to protocol. For example, in a read operation, as illustrated with reference to FIG. 2, the master mode device may transmit the start bit(s) and the serial bus slave address onto the bus, the slave mode device may acknowledge and send back the serial bus master address onto the bus, the master mode may acknowledge, and the slave mode device may then transfer individual bytes from the payload until finished and as long as the master mode device acknowledges each byte transfer. Alternatively, for a write operation, the master mode device may send the start bit(s), the serial bus slave address, the serial bus master address, the payload, and the stop bit (s) while the slave mode device may send an acknowledge for each byte transfer. In an embodiment, all recipient devices may return a three-byte unique ID and firmware version 530 after the transmitting device sends the frame, as shown in FIG. 6. In other embodiments, various information, including identifying the version of the recipient device, may be sent by the recipient device onto the serial data bus.

The basic steps of the process may be as follows. The transmitting device enters master mode and sends an address of the designated recipient device on the bus. The designated recipient device acknowledges the transmission. For example, the master mode device may send the command FF-D0 onto the bus. The master mode device may then enter a receive mode and address the intended recipient device again. Thereafter, the master mode device waits for a three byte information packet from the intended recipient device. If desired, byte 2 of FIG. 6 may be used for configuration information. This may be specified in the slave mode device's communications specification. A device having master mode may scan the other devices on the bus for their version information. This may be done on power up, periodically, after a fault condition, by user inquiry, etc.

The implementation of the present invention may entail retrofitting current devices on the bus. In certain cases, it may be necessary to replace hardware. Otherwise, the changes may be programmed into device memory, such as an electrically erasable programmable read only memory. The present invention may be implemented in software, hardware, and/or firmware.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for communicating across a serial data bus including two or more master mode devices coupled to the serial data bus, comprising the steps of:
   sending a designated recipient device address from one of the two or more master mode devices onto the bus to a designated recipient device, each of the two or more master mode devices including a timer for controlling a wait cycle for each of the two or more master mode devices, the designated receipt device being a slave mode device; and
   sending an acknowledge from the designated recipient device;
   sending identification information for the one of the two or more master mode devices,
   wherein the two or more master mode devices are capable of communicating with each other via the serial data bus and the timer within each of the two or more master mode devices places one of the two or more master mode devices into a wait cycle if the slave mode device fails to send an acknowledge and the bus is unavailable, upon termination of the wait cycle the one of the two or more master mode devices placed into a wait cycle resends its designated recipient device address to the designated recipient device.

2. The method of claim 1, the identification information for the one of the two or more master mode devices comprising an address of the one of the two or more master mode devices.

3. The method of claim 1, further comprising the step of resending the designated recipient device address after the step of sending an acknowledge.

4. The method of claim 1, further comprising the step of sending a byte from the master mode device.

5. The method of claim 1, further comprising the step of sending a command from the designated recipient device after the step of sending a designated recipient device address.

6. The method of claim 1, the serial data bus being an Inter Integrated Circuit bus.

7. The method of claim 1, further comprising the step of sending version information about the designated recipient device from the designated recipient device onto the serial data bus after the step of sending a designated recipient device address.

8. The method of claim 1, further comprising the step of sending a master mode device address from the master mode device after the step of sending an acknowledge from the designated recipient device.

9. The method of claim 8, further comprising the step of sending a byte by the master mode device after the step of sending a master mode device address from the master mode device,
   wherein the byte is part of three byte packet information.

10. The method of claim 1, further comprising the step of sending a master mode address from the slave mode device after the step of sending an acknowledge from the designated recipient.

11. The method of claim 10, further comprising the step of sending a byte by the designated recipient device after the step of sending a master mode device address from the slave mode device,
    wherein the byte is part of three byte packet information.

12. A bus system through which a plurality of devices are connected, comprising:
    a serial data bus; and
    a plurality of devices connected to the serial data bus, each of the plurality of devices having a slave mode and at least two of the plurality of devices having a master mode, the at least two of the plurality of devices having a master mode including a timer for controlling a wait cycle for each of the at least two plurality of devices including a master mode in which one of the plurality of devices is in a master mode and initiates communications with another one of the plurality of devices being a designated recipient device, the designated recipient device providing version information to the one of the plurality of devices in master mode via the serial data bus,
    wherein the at least two of the plurality of devices having a master mode are capable of communicating with each other via the serial data bus,
    and the timer within each of the two or more master mode devices places one of the two or more master mode devices into a wait cycle if the one of the plurality of devices in slave mode fails to acknowledge the initiated communications and the bus is unavailable.

13. The bus system of claim 12, the designated recipient device sending a command to the one of the plurality of devices in master mode.

14. The bus system of claim 12, the one of the plurality of devices in master mode initiating communications with the designated recipient device by identifying information about the designated recipient device.

15. The bus system of claim 14, the one of the plurality of devices in master mode sending identifying information about the one of the plurality of devices in master mode.

16. The bus system of claim 14, the designated recipient device sending identifying information about the one of the plurality of devices in master mode.

17. The bus system of claim 15, the serial data bus being an Inter Integrated Circuit bus.

18. A method for communicating across a serial data bus through which two or more master mode devices are coupled to the serial data bus, comprising the steps of:
    a) sending identifying information from one of the two or more master mode devices onto the bus to a designated recipient device, each of the two or more master mode devices including a timer for controlling a wait cycle for each of the two or more master mode devices and the designated recipient device including a slave mode; and b) sending version information from the designated recipient device onto the bus to the one of the two or more master mode devices, wherein the two or more master mode devices are capable of communicating with each other via the serial data bus and the timer within each of the two or more master mode devices places one of the two or more master mode devices into a wait cycle if the designated recipient device while in slave mode fails to acknowledge the identifying information sent from one of the two or more master mode devices and the bus is unavailable.

19. The method of claim 18, further comprising the step of sending information identifying the one of the two or more master mode devices from the master mode device.

20. The method of claim 18, further comprising the step of sending information identifying the one of the two or more master mode devices from the designated recipient device.

21. The method of claim 18, the serial data bus being an Inter Integrated Circuit bus.

* * * * *